(12) United States Patent
Pinon

(10) Patent No.: US 10,886,582 B2
(45) Date of Patent: Jan. 5, 2021

(54) COOLING FIN SPACER

(71) Applicant: James O. Pinon, Troy, MI (US)

(72) Inventor: James O. Pinon, Troy, MI (US)

(*) Notice: Subject to any disclaimer, the term of this patent is extended or adjusted under 35 U.S.C. 154(b) by 26 days.

(21) Appl. No.: 16/440,940

(22) Filed: Jun. 13, 2019

(65) Prior Publication Data

US 2019/0386361 A1 Dec. 19, 2019

Related U.S. Application Data

(60) Provisional application No. 62/684,481, filed on Jun. 13, 2018.

(51) Int. Cl.

| | |
|---|---|
| *H01M 10/6555* | (2014.01) |
| *H01M 10/6551* | (2014.01) |
| *H01M 2/10* | (2006.01) |
| *H01M 10/647* | (2014.01) |
| *H01M 10/613* | (2014.01) |
| *H01M 2/16* | (2006.01) |
| *H01M 10/625* | (2014.01) |

(52) U.S. Cl.
CPC ..... *H01M 10/6555* (2015.04); *H01M 2/1077* (2013.01); *H01M 2/16* (2013.01); *H01M 10/613* (2015.04); *H01M 10/625* (2015.04); *H01M 10/647* (2015.04); *H01M 10/6551* (2015.04); *H01M 2220/20* (2013.01)

(58) Field of Classification Search
CPC ......... H01M 10/6555; H01M 10/6551; H01M 2/1077; H01M 10/647; H01M 10/613; H01M 2/16
See application file for complete search history.

(56) References Cited

U.S. PATENT DOCUMENTS

| | | | |
|---|---|---|---|
| 10,483,604 B2 * | 11/2019 | Yamamoto | H01M 10/6563 |
| 2017/0324125 A1 * | 11/2017 | Schoenherr | H01M 2/1077 |
| 2018/0138563 A1 * | 5/2018 | Behm | H01M 10/0481 |

* cited by examiner

*Primary Examiner* — Stewart A Fraser
(74) *Attorney, Agent, or Firm* — Mitchell Law PLLC; Matthew W. Mitchell

(57) ABSTRACT

A system comprising a multi-cell energy storage device is provided and includes a first battery cell pack, a first battery cell cooling fin situated on a side of the first battery cell pack, a second battery cell pack, a second battery cell cooling fin situated on a side of the second battery cell pack, and at least one battery cell interconnect device holding the first battery cell cooling fin separate from the second battery cell cooling fin. The first battery cell cooling fin and the second battery cell cooling fin are situated between the first battery cell pack and the second battery cell pack. The battery cell interconnect device is configured to insulate the first battery cell cooling fin from the second battery cell cooling fin.

13 Claims, 18 Drawing Sheets

DETAIL A

US 10,886,582 B2

COOLING FIN SPACER

CROSS-REFERENCE TO RELATED APPLICATIONS

This disclosure claims priority to U.S. Provisional Patent Application No. 62/684,481 filed on Jun. 13, 2018, which is hereby incorporated by reference.

TECHNICAL FIELD

This disclosure is related to thermal management systems. In particular, the disclosure is related to heat management, for example, in multi-cell devices used in electrically powered or hybrid power vehicles or stationary or back-up power systems.

BACKGROUND

The statements in this section merely provide background information related to the present disclosure. Accordingly, such statements are not intended to constitute an admission of prior art.

Co-pending U.S. application Ser. No. 14/853,936 filed on Sep. 14, 2015, Ser. No. 15/856,127 filed on Dec. 28, 2017, and Ser. No. 15/904,074 filed in Feb. 23, 2018 are hereby incorporated by reference and disclose graphene enhanced cooling fins which are used in series to border on each flat side of a rectangular battery cell to transfer heat from and provide structural rigidity to the battery cells.

Batteries used in vehicular-scale energy storage generate significant heat, for example, during charging cycles and during power generation/discharge cycles. Placing fins, for example, made of steel or aluminum between battery cells is known whereby the fins act as heat sinks, drawing heat away from the battery cells and transmitting the heat away from the batteries. However, package space within battery packs is limited, and the fins generally must be thin to fit the required package size. As a result, simple fins are limited in how much heat they can manage in a battery pack including multiple battery cells.

Other cooling fin configurations are known. One configuration includes a hollow fin passing a liquid through the fin and exchanging heat from the proximate battery cells into the liquid which is then cycled out of the fin and cooled through known thermal cycles. However, such systems are inherently complex, requiring waterproof seals at every connection point; expensive, requiring a liquid pump and a connecting heat exchanger to dissipate the heat; and prone to exposing the battery cells to liquid from leaking fins and connections.

Stacks of cooling fins and battery cells create both electrical current and heat. Metal cooling fins are good conductors of both heat and electrical current. While conducting heat away from a hot battery cell can be advantageous and electrical conductivity through a cooling fin can in some instances be advantageous, there are conditions in which it is desirable to insulate one battery cell from a next battery cell.

SUMMARY

A system comprising a multi-cell energy storage device is provided and includes a first battery cell pack, a first battery cell cooling fin situated on a side of the first battery cell pack, a second battery cell pack, a second battery cell cooling fin situated on a side of the second battery cell pack, and at least one battery cell interconnect device holding the first battery cell cooling fin separate from the second battery cell cooling fin. The first battery cell cooling fin and the second battery cell cooling fin are situated between the first battery cell pack and the second battery cell pack. The battery cell interconnect device is configured to insulate the first battery cell cooling fin from the second battery cell cooling fin.

According to one embodiment of the disclosure, the disclosed system includes a first battery cell pack, a first rectangular battery cell cooling fin situated on a side of the first battery cell pack, a first set of four battery cell interconnect devices attached to four corners of the first battery cell cooling fin, a second battery cell pack, a second rectangular battery cell cooling fin situated on a side of the second battery cell pack, and a second set of four battery cell interconnect devices attached to four corners of the second battery cell cooling fin. The first battery cell cooling fin and the second battery cell cooling fin are situated between the first battery cell pack and the second battery cell pack. The battery cell interconnect devices are configured to separate and insulate the first battery cell cooling fin from the second battery cell cooling fin.

BRIEF DESCRIPTION OF THE DRAWINGS

One or more embodiments will now be described, by way of example, with reference to the accompanying drawings, in which.

DETAILED DESCRIPTION

A system, device, or apparatus including a cooling fin for use in multiple cell battery packs is disclosed, replacing traditional cooling fins and related designs used to remove heat from or transfer heat to battery cells, fuel cells, multiple cell capacitors, or similar energy storage devices. The disclosed system, device, or apparatus further includes one or more battery interconnect devices useful to connect, separate and insulate neighboring cooling fins from each other.

Figure 1A:
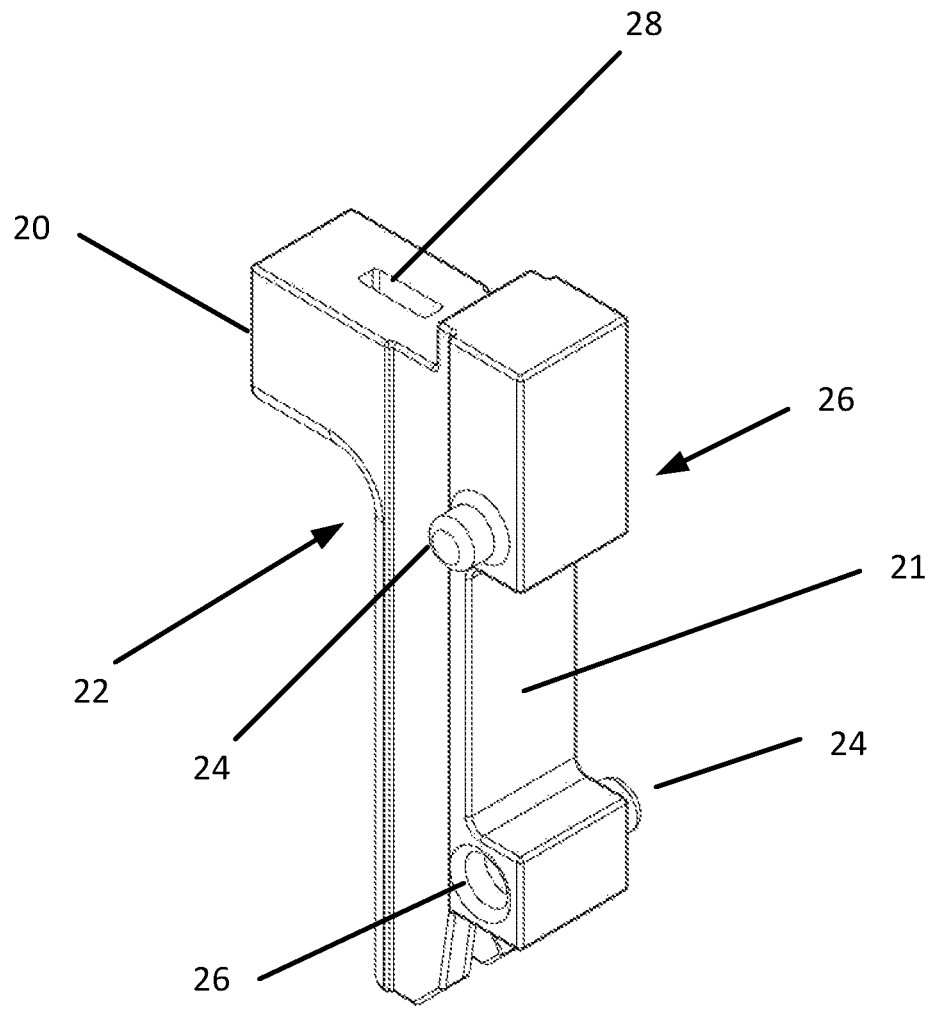
FIGS. 1A and 1B illustrate in perspective view an exemplary battery cell interconnect device, in accordance with the present disclosure.
Figure 1B:
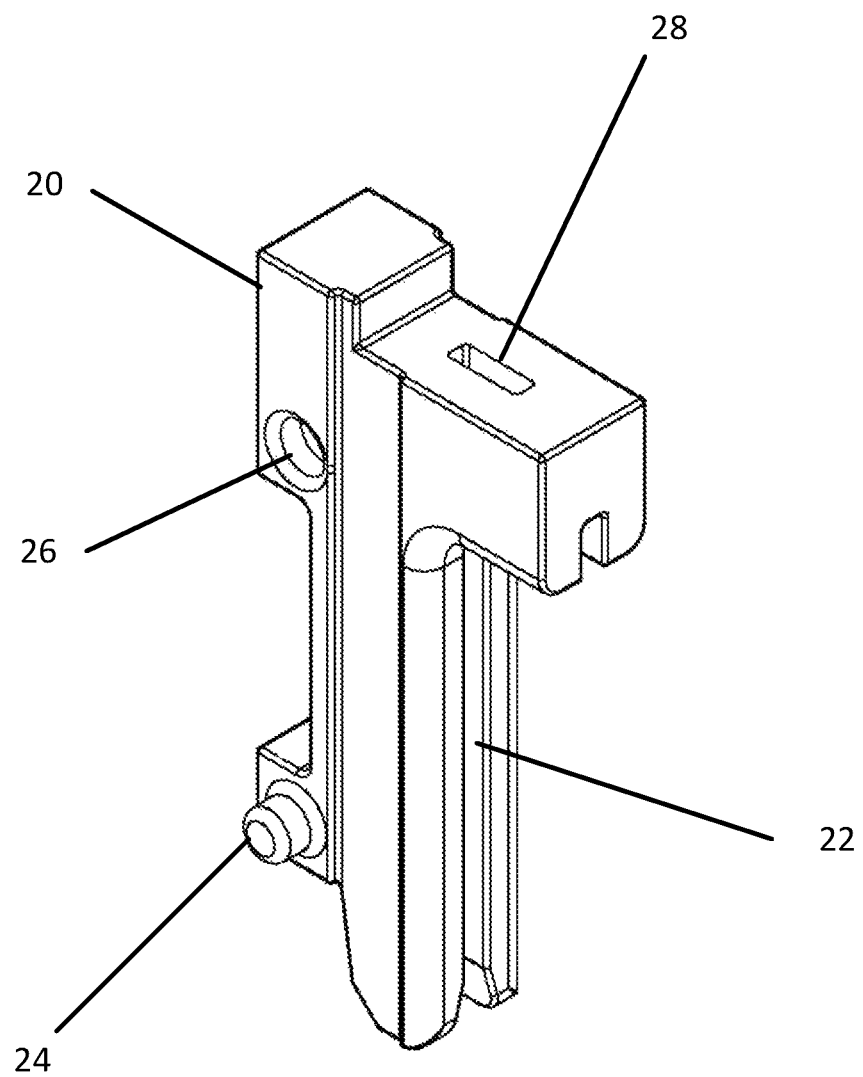

FIGS. 1A and 1B illustrate an exemplary battery cell interconnect device. FIG. 1A illustrates the battery cell interconnect device from a first perspective view. FIG. 1B illustrates the battery cell interconnect device from a second perspective view. Battery cell interconnect device 20 is illustrated including slot 22 configured to receive a corner of a battery cell component such as a battery cell cooling fin. Battery cell interconnect device 20 is illustrated further including a plurality of interconnect device stacking features including male stacking features 24 and female stacking features 26. Battery cell interconnect device 20 is configured to be aligned with and attached to similar or precisely the same configuration of battery cell interconnect devices on either side, attaching at least one male stacking feature 24 to at least one female stacking feature 26, thereby enabling multiple battery cell components to be held in place and separate from each other by a plurality of battery cell interconnect devices 20. Battery cell interconnect device 20 is illustrated further including an optional corner tab hole 28 configured to receive a corner tab located on a battery cell cooling fin or other similar battery cell component. Corner tab hole 28 can aid in aligning battery cell interconnect device 20 properly to the mating features of the battery cell component it is being attached to.

According to one optional feature of battery cell interconnect device 20, a side notch 21 can be provided. Side notch 21, when provide on a series of battery cell interconnect devices 20 along a side of an elongated battery cell stack can be used to channel a belt strap or containment/compression strap that can be used to provide structural rigidity to the battery cell stack.

Figure 2A:
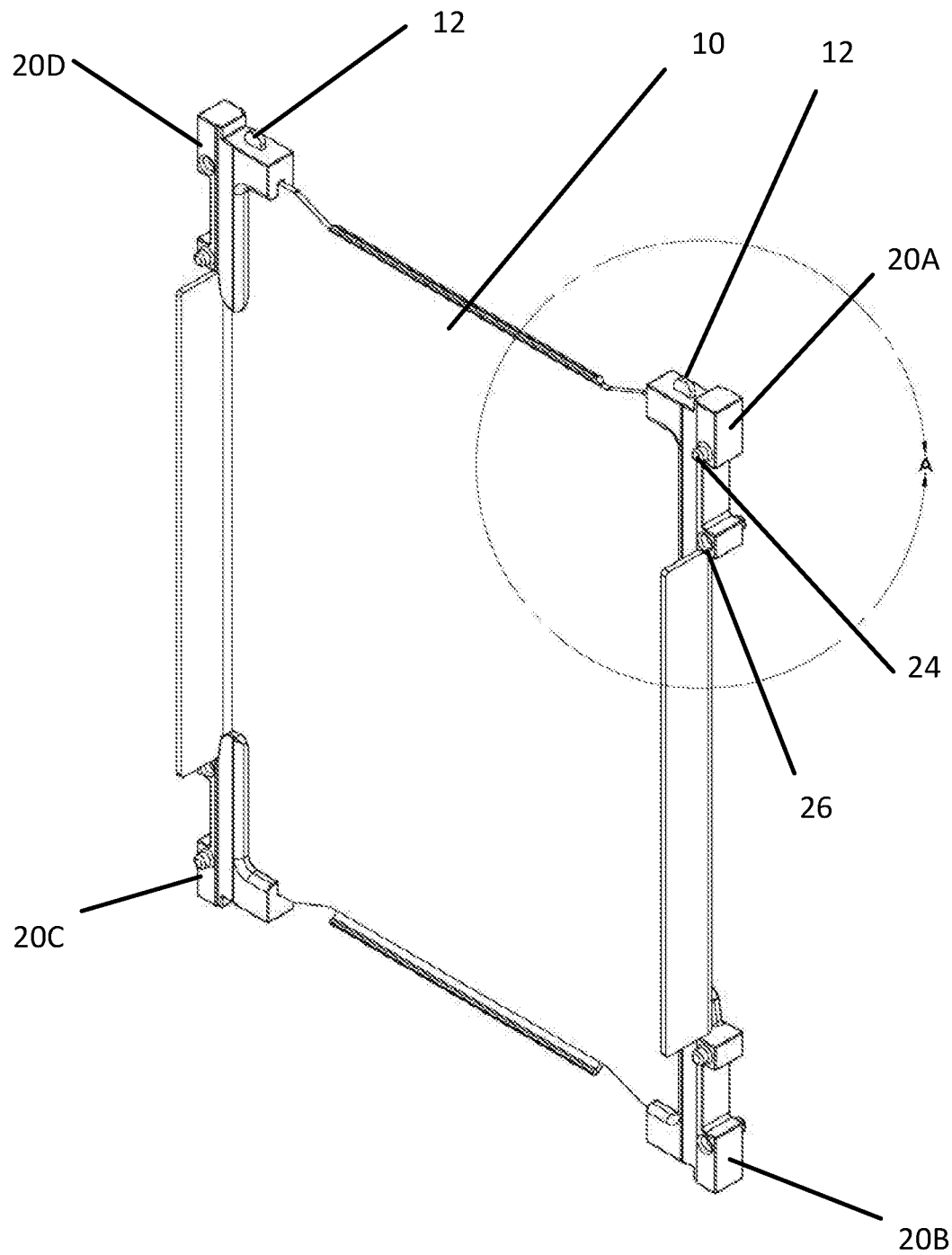
FIGS. 2A and 2B illustrate an exemplary battery cell cooling fin with four exemplary battery cell interconnect devices illustrated in FIG. 1A attached to corners of the battery cell cooling fin, in accordance with the present disclosure.
Figure 2B:
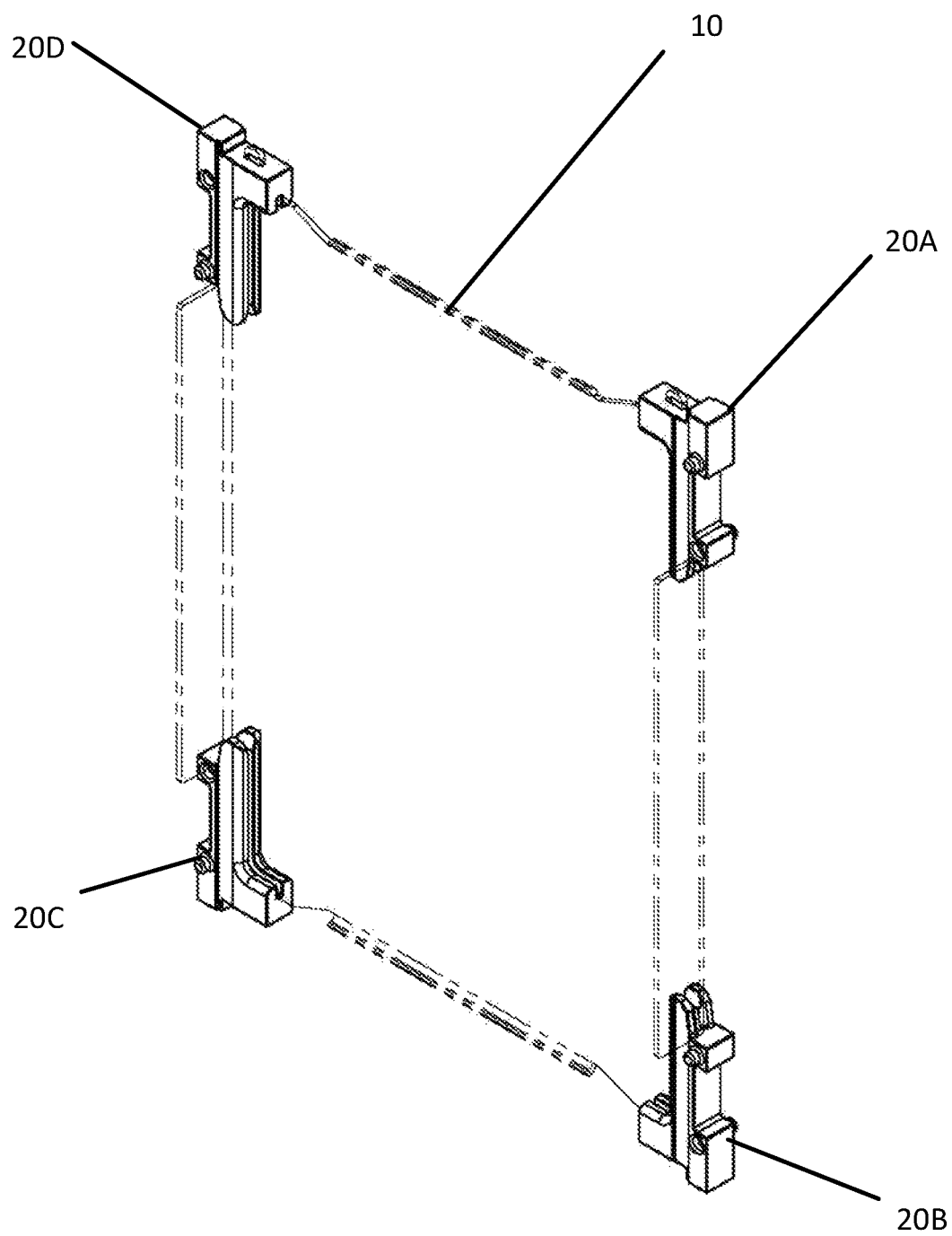

Battery cell interconnect devices can be used in any number to aid in holding in place and keeping separate a plurality of battery cell components. In one embodiment, one battery cell interconnect device can span an entire upper edge or side edge of a battery cell component. In another embodiment, four battery cell interconnect devices can be configured to attach to centers of four side edges of an exemplary flat, rectangular battery cell cooling fin, with an exemplary small hole in the cooling fin matching a tab located on the battery cell interconnect device to aid in snapping the battery cell interconnect device into place upon the cooling fin. FIGS. 2A and 2B illustrate an exemplary battery cell cooling fin with four exemplary battery cell interconnect devices attached to corners of the battery cell cooling fin. FIG. 2A illustrates the battery cell cooling fin in a perspective view. FIG. 2B illustrates the battery cell cooling fin in a perspective view, with the cooling fin illustrated with dotted lines to illustrate details of the battery cell interconnect devices with increased clarity. Battery cell cooling fin 10 is illustrated including a metallic or plastic substrate which can be improved with a layer of graphene material applied to at least one surface of the cooling fin or impregnated within the material of the substrate. Battery cell cooling fin 10 may include one or more corner tabs 12, which can be used to properly align each of a plurality of battery cell interconnect devices, for example, including battery cell interconnect device 20A, battery cell interconnect device 20B, battery cell interconnect device 20C, and battery cell interconnect device 20D. Battery cell interconnect device 20A, battery cell interconnect device 20B, battery cell interconnect device 20C, and battery cell interconnect device 20D may be a same device, or, in some embodiments, one or more of battery cell interconnect device 20A, battery cell interconnect device 20B, battery cell interconnect device 20C, and battery cell interconnect device 20D may include different features from the other devices.

Battery cell interconnect device 20A is illustrated including male stacking feature 24 and female stacking feature 26. A particular area of FIG. 2A is designated as Detail A.

Figure 3:
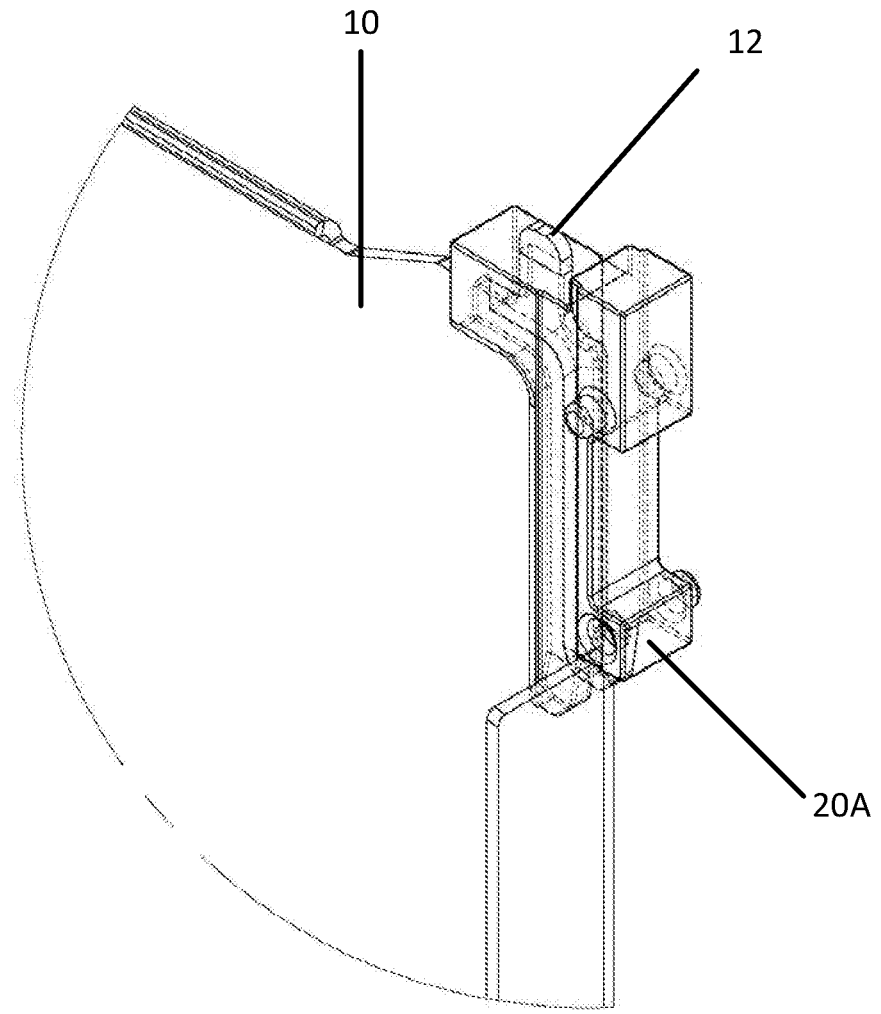
FIG. 3 illustrates Detail A of FIG. 2 in magnified detail, with hidden features of the battery cell cooling fin and the battery cell interconnect device illustrated with dotted lines for clarity sake, in accordance with the present disclosure.

FIG. 3 illustrates Detail A of FIG. 2A in magnified detail, with hidden features of the battery cell cooling fin and the battery cell interconnect device illustrated with dotted lines for clarity sake. Battery cell cooling fin 10 is illustrated, with corner tab 12 being illustrated projecting through a corner tab hole of battery cell interconnect device 20A. Battery cell cooling fin 10 is illustrated as an exemplary flat plate with features bent upon the flat plate. A slot of battery cell interconnect device 20A is configured to receive and fit around a corner of the flat plate.

Figure 4:
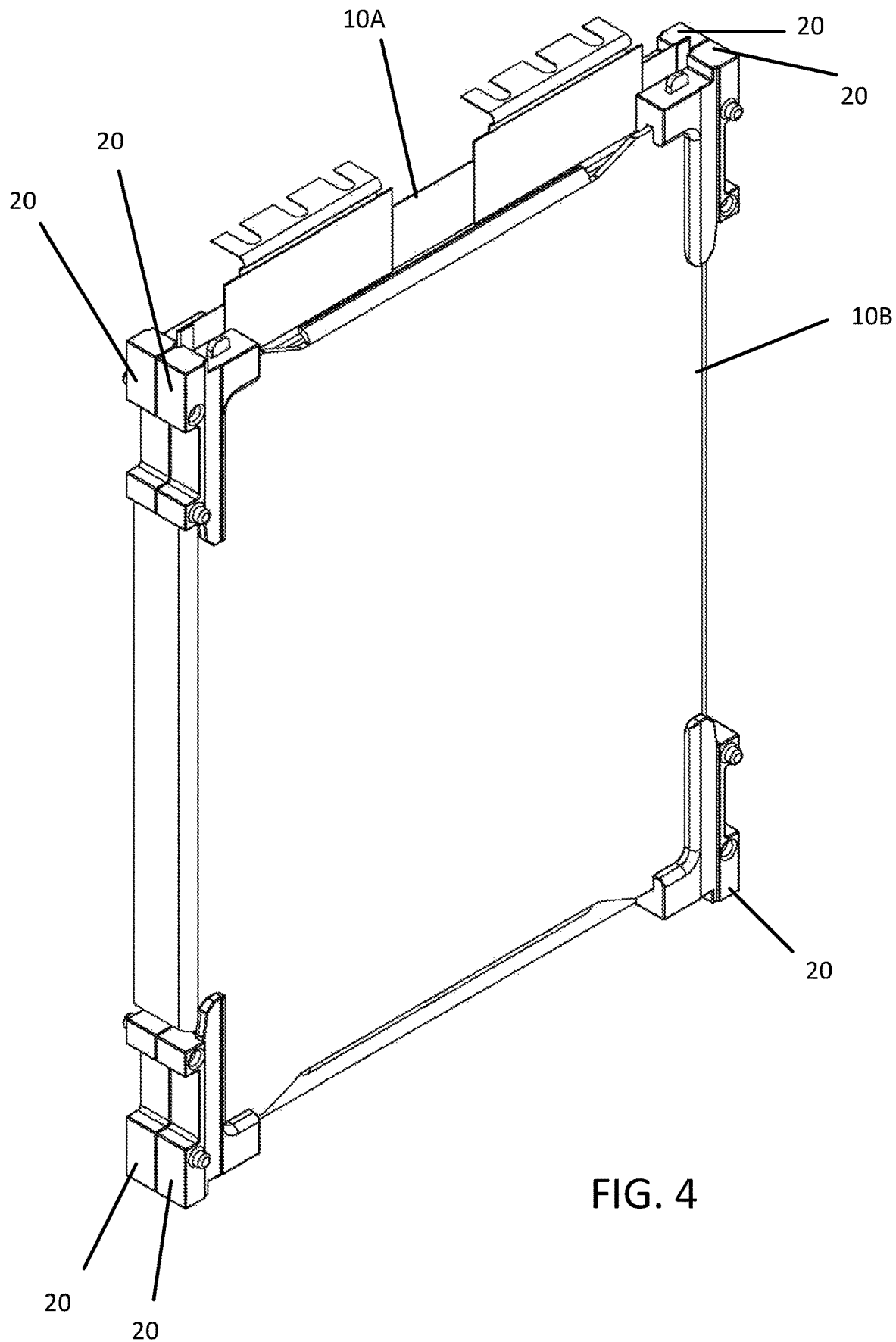
FIG. 4 illustrates in perspective view an exemplary stack of cooling fins with battery cell interconnect devices separating the cooling fins, in accordance with the present disclosure.

FIG. 4 illustrates in perspective view an exemplary stack of cooling fins with battery cell interconnect devices separating the cooling fins. Battery cell cooling fin 10A is illustrated including a generally flat, rectangular plate, with a plurality of battery cell interconnect devices 20 attached at each of the four corners of battery cell cooling fin 10A. Battery cell cooling fin 10B is illustrated including a generally flat, rectangular plate, with a plurality of battery cell interconnect devices 20 attached at each of the four corners of battery cell cooling fin 10B. Stacking features of each of the battery cell interconnect devices 20 are configured to matingly attach to stacking features of a neighboring battery cell interconnect device 20. Battery cell interconnect devices 20 attached to battery cell cooling fin 10A are connected to battery cell interconnect devices 20 attached to battery cell cooling fin 10B and hold each of the cooling fins in place and separate from each other.

Battery cell interconnect devices can be constructed of thermally and/or electrically insulating materials. For example, a polymer material can be utilized. In another example, a glass-filled polymer or a polymer infused with glass particles to increase the insulating properties of the polymer can be used.

By using insulating materials in the battery cell interconnect devices and by holding the connected battery cell components separate from each other, greater thermal and electrical control can be exercised over a plurality of battery cells within a single battery cell stack. For example, if a particular battery cell goes above a desired temperature range, this excess heat in that battery cell will not transfer significantly to neighboring battery cells. That battery cell can be electronically deactivated, ceasing power flow to or from that battery cell for a time, to enable the battery cell to cool, without deactivating neighboring battery cells.

Figure 5:
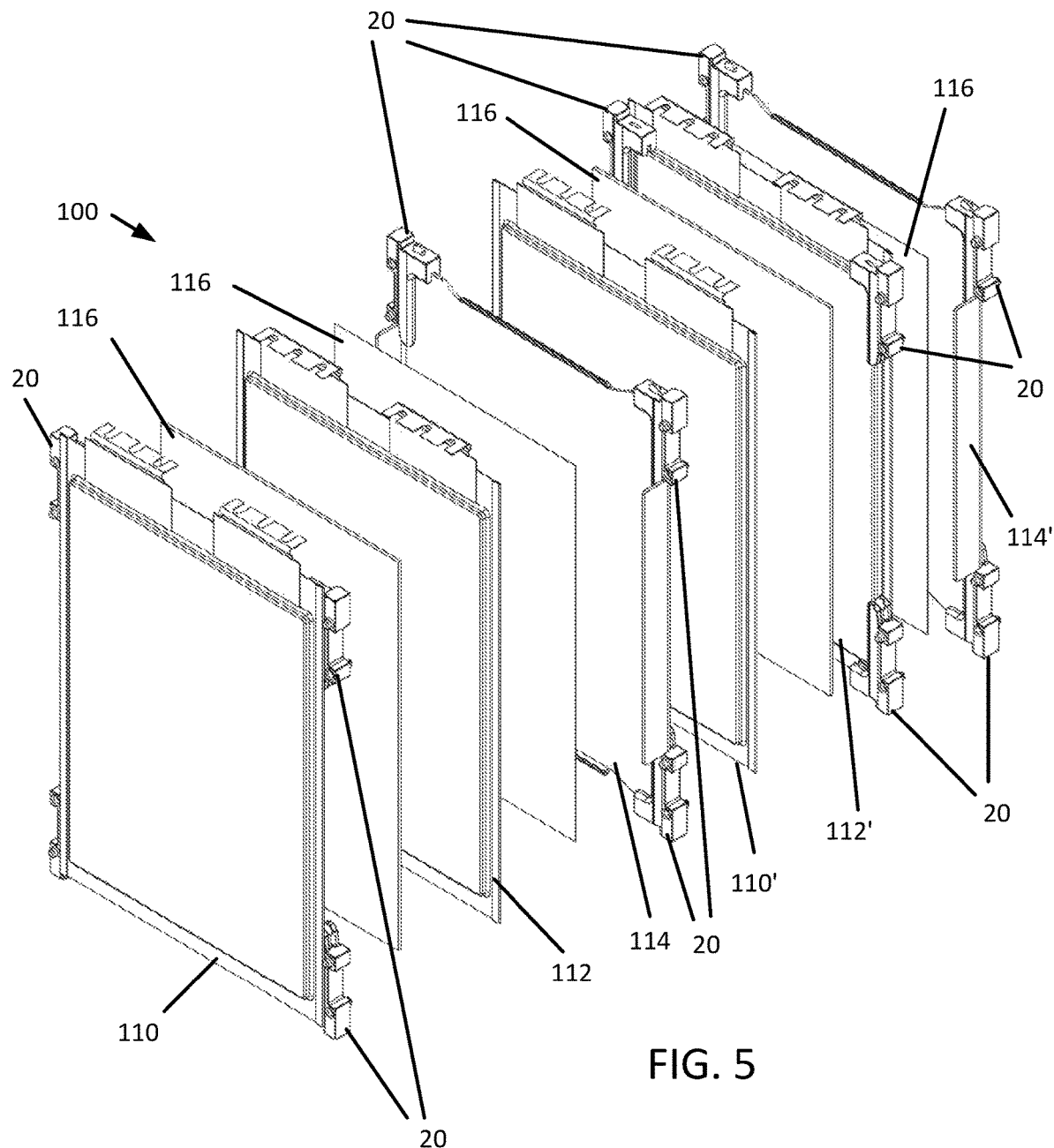
FIG. 5 illustrates in disassembled perspective view an exemplary arrangement of battery components including battery cell interconnect devices configured to separate the various components when assembled, in accordance with the present disclosure.

FIG. 5 illustrates in disassembled perspective view an exemplary arrangement of battery components including battery cell interconnect devices configured to separate the various components when assembled. Battery cell stack 100 is illustrated with various battery cell components pulled apart from each other for purpose of illustrating the components with clarity. Battery cell cooling fins 110 and 114 are illustrated on either side of battery cell pack 112. Battery cell pack 112 can include an exemplary pouch cell battery pack or other similar battery cell packs known in the art. Such battery cells store and release energy for use in electrical power applications, such as providing electrical energy useful in an electric vehicle. When in use, battery cell pack 112 can generate significant heat. Battery cell cooling fins 110 and 114 are situated on either side of the flat faces of battery cell pack 112, such that they can receive heat from and transfer heat away from battery cell pack 112. Thermal interface materials 116 are illustrated situated between battery cell pack 112 and each of battery cell cooling fins 110 and 114 in order to facilitate heat transfer between battery cell pack 112 and battery cell cooling fins 110 and 114. Similarly, battery cell cooling fins 110' and 114' are situated on either side of the flat faces of second battery cell pack 112', with thermal interface materials 116 located between battery cell pack 112' and each of battery cell cooling fins 110' and 114'.

Any of battery cell cooling fins 110, 114, 110', and 114' and battery cell packs 112 and 112' can be configured to be attached to battery cell interconnect devices at their corners. In the illustrated example of FIG. 5, each of battery cell cooling fins 110, 114, and 114' are attached to battery cell interconnect devices 20 at each corner battery cell pack 112' is attached to battery cell interconnect devices 20 at each corner. When assembled, battery cell cooling fins 110 and 114 are in thermal connection with battery cell pack 112, and battery cell cooling fins 110' and 114' are in thermal connection with battery cell pack 112'. However, battery cell interconnect devices 20 maintain space between battery cell cooling fin 114 and battery cell cooling fin 110', such that substantial heat transfer and electrical connectivity between battery cell cooling fin 114 and battery cell cooling fin 110' is prevented.

According to one embodiment of the invention, battery cell pack 112 is illustrated including a rectangular body portion. Further, battery cell cooling fin 110 is illustrated including a rectangular shaped depression in the flat face of the cooling fin. The rectangular shaped depression of battery cell cooling fin 110 can be configured to receive and hold in place the rectangular shaped battery cell 112. Such an arrangement holds battery cell pack 112 firmly in place between the neighboring cooling fins without any additional supports or brackets.

Figure 6:
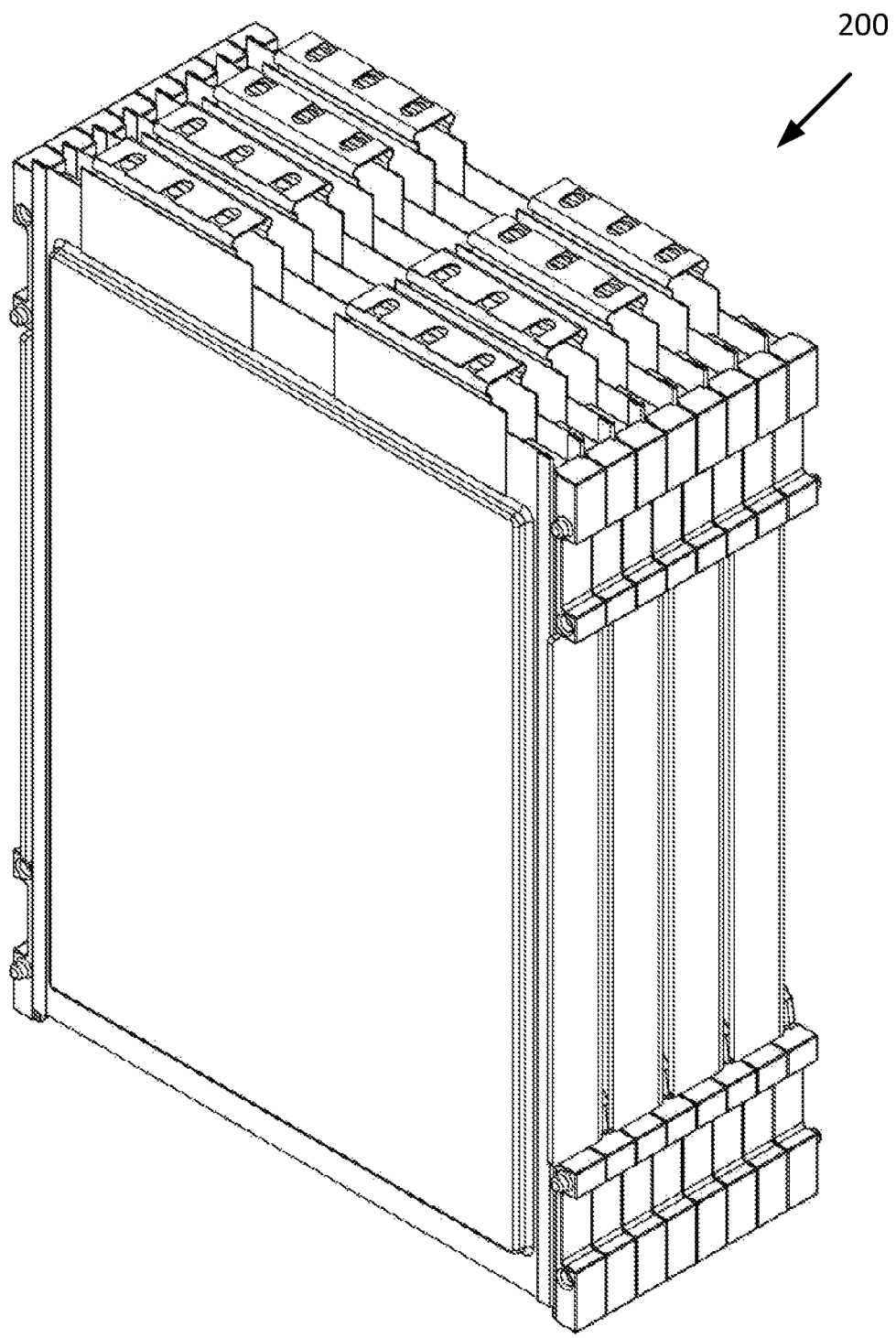
FIG. 6 illustrates in perspective view an exemplary battery cell stack including repeated iterative stacks of battery cell components, with battery cell interconnect devices separating the battery cell components, in accordance with the present disclosure.
Figure 7:
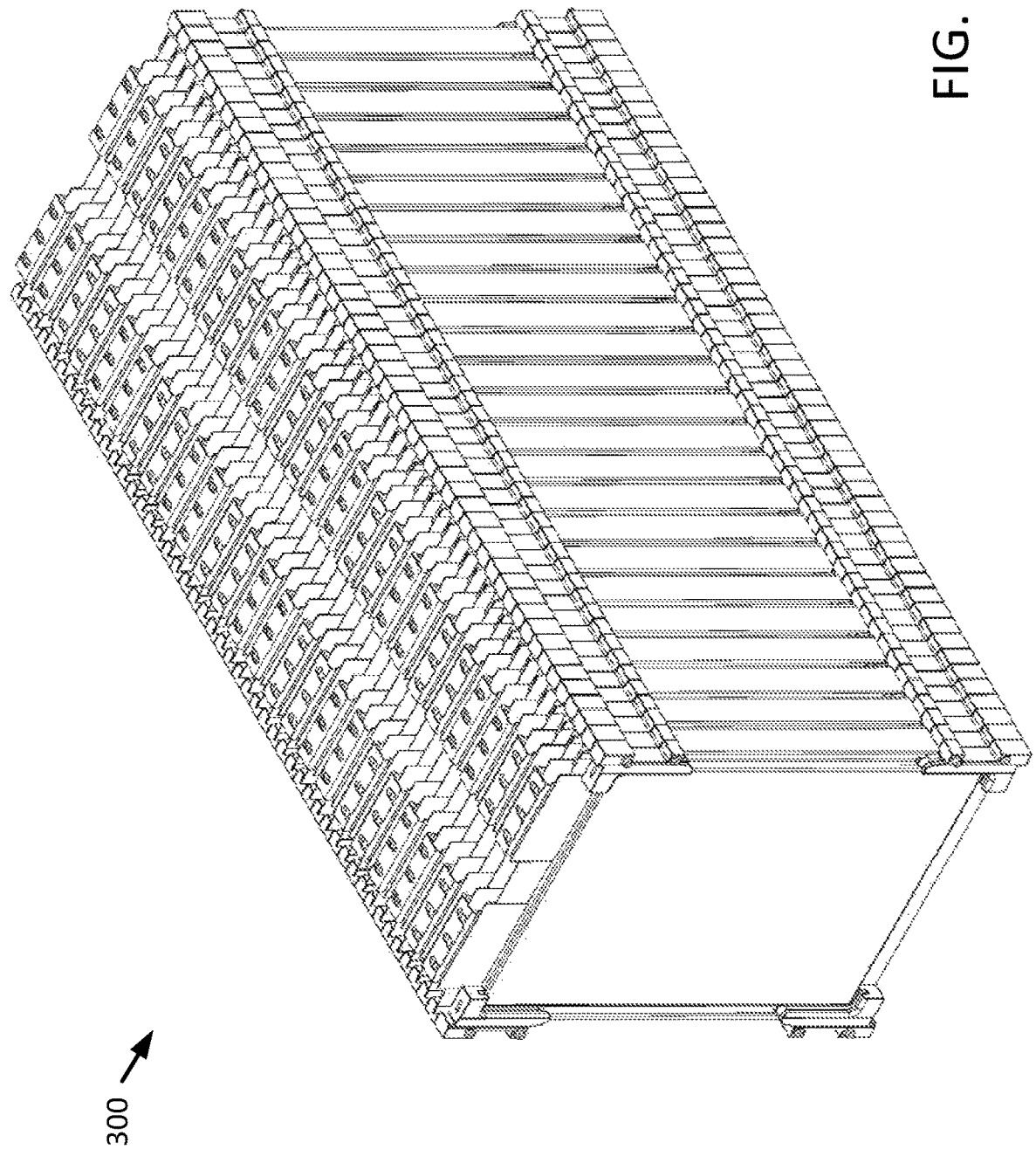
FIG. 7 illustrates in perspective view an exemplary battery cell stack similar to the battery cell stack illustrated in FIG. 6, with the stack together including functionality to act as a battery cell bank for an exemplary electric vehicle, in accordance with the present disclosure.

FIG. 6 illustrates in perspective view an exemplary battery cell stack including repeated iterative stacks of battery cell components, with battery cell interconnect devices separating the battery cell components. Battery cell stack 200 is illustrated, with a plurality of battery cell packs sandwiched between pairs of battery cell cooling fins, with space being maintained between the battery cell cooling fins of different battery cell packs by insulating battery cell interconnect devices. FIG. 7 illustrates in perspective view an exemplary battery cell stack similar to the battery cell stack illustrated in FIG. 6, with the stack together including functionality to act as a battery cell bank for an exemplary electric vehicle. Battery cell stack 300 is similar to battery cell stack 200 of FIG. 6, with more iterations of battery cell packs sandwiched between battery cell cooling fin pairs.

Figure 8:
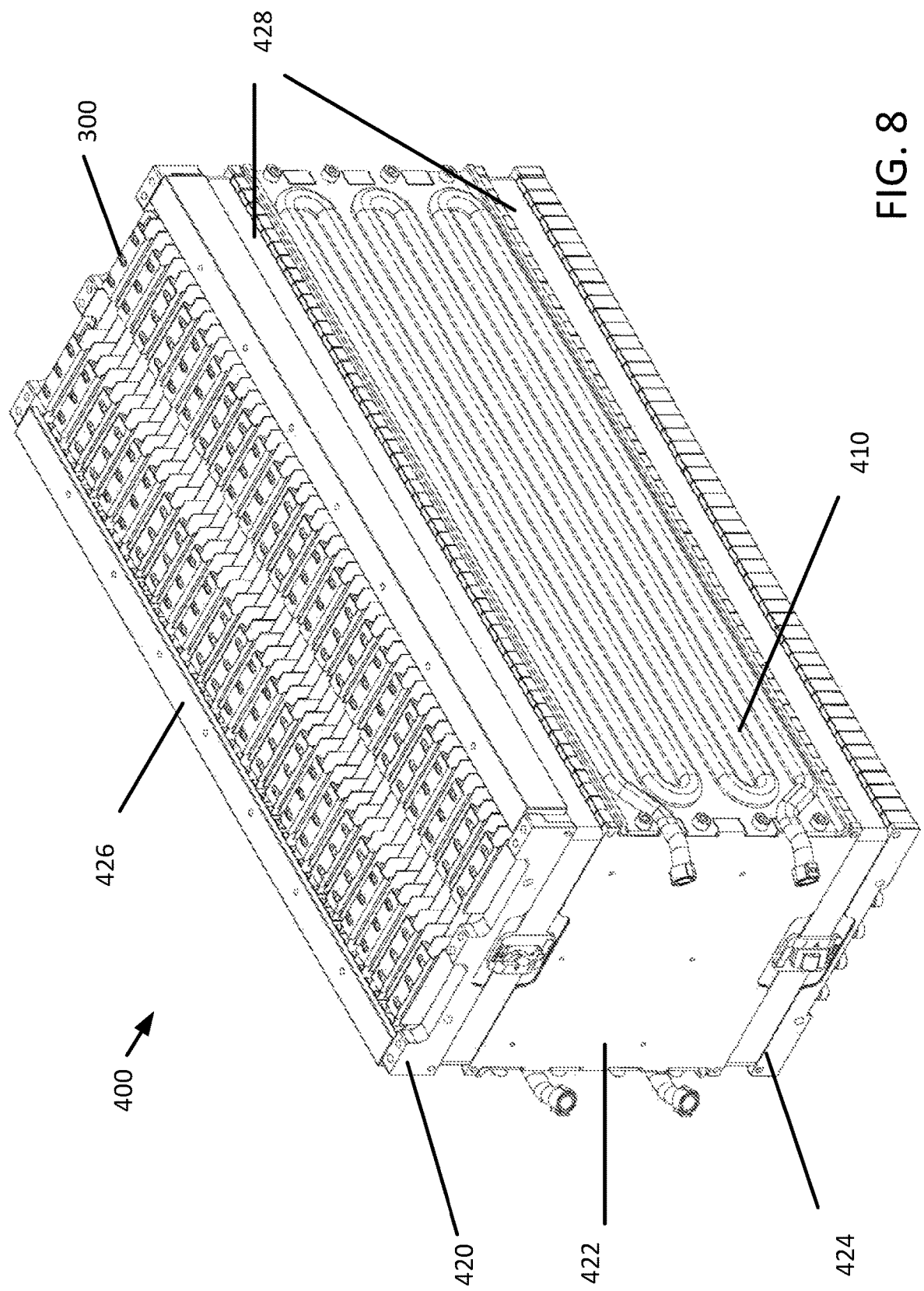
FIG. 8 illustrates in perspective view the battery cell stack of FIG. 7, with additional structural and battery cell cooling features assembled to the stack, in accordance with the present disclosure.

FIG. 8 illustrates in perspective view the battery cell stack of FIG. 7, with additional structural and battery cell cooling features assembled to the stack. Battery cell stack assembly 400 is illustrated including battery cell stack 300 of FIG. 7 including at least one cooling circuit tube 410 attached to a side of battery cell stack 300. Each of the cooling fins of battery cell stack 300 may be configured to transfer heat from the neighboring battery cell pack to cooling circuit tube 410. Cooling circuit tube 410 can be attached to a cooling circuit, which may, for example, provide a liquid coolant flow through cooling circuit tube 410 for subsequent cooling in a connected radiator device.

Structural features 420, 422, 424 are illustrated attached to narrow end of battery cell stack 300, and structural features 426 and 428 are illustrated attached to longitudinally elongated sides of battery cell stack 300. In one embodiment, structural feature 428 can include one or more belt straps that go around an entirety of the battery cell stack 300, maintaining overall structural integrity of the stack through compression. Structural features 420, 422, 424, 426, and 428 are exemplary and provide structural rigidity to battery cell stack assembly 400.

Battery cell interconnect devices of the illustrated battery cell stack assembly 400 are in direct connection with each other. It will be appreciated that the aligned thicknesses of the battery cell interconnect devices define an overall length of battery cell stack 300. These battery cell interconnect devices receive all compressive forces applied by the belt straps or other structural features, such that the compression upon the battery cell components within battery cell stack 300 is generally a known value and does not vary substantially with reasonably varying values of compression placed upon the battery cell interconnect devices. This protection provided to the battery cell components increases quality and durability metrics for the battery cell stack and makes manufacturing of the battery cell stack easier.

Figure 9:
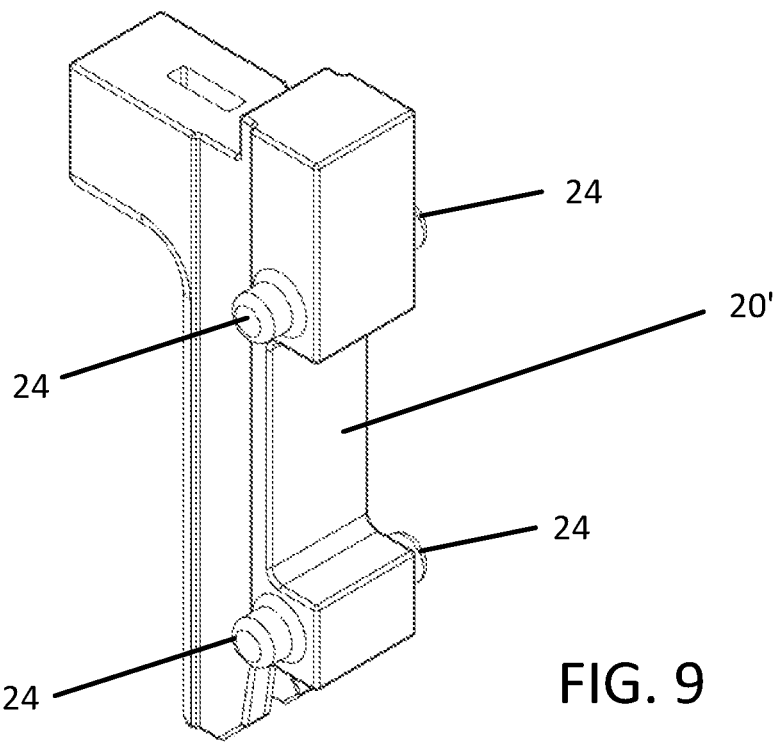
FIG. 9 illustrates a first exemplary alternative embodiment of a battery cell interconnect device, in accordance with the present disclosure.
Figure 10:
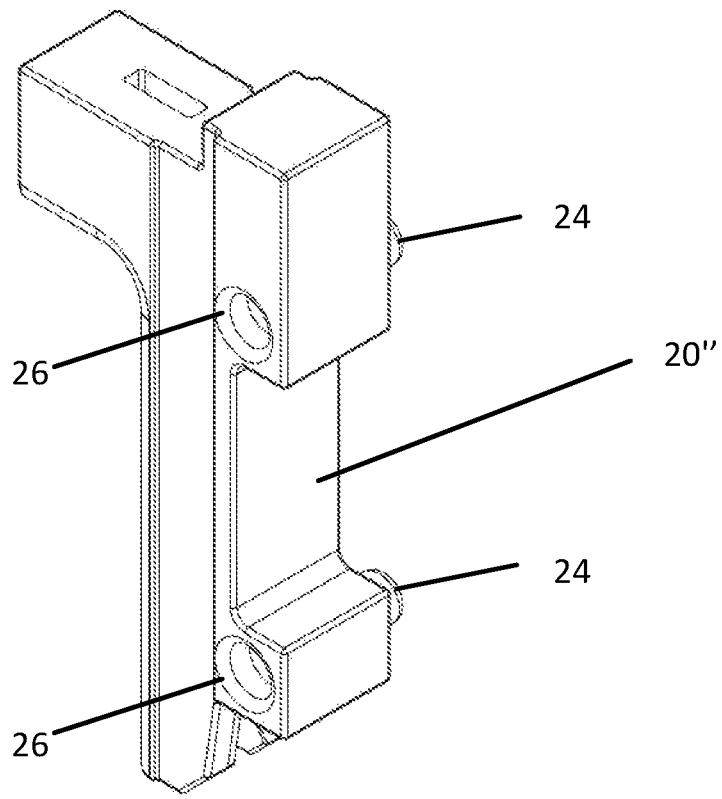
FIG. 10 illustrates a second exemplary alternative embodiment of a battery cell interconnect device, in accordance with the present disclosure.

A wide variety of alternative embodiments of battery cell interconnect devices are envisioned, and the disclosure is not intended to be limited to the particular examples provided herein. FIG. 9 illustrates a first exemplary alternative embodiment of a battery cell interconnect device. Battery cell interconnect device 20' is illustrated including a plurality of male stacking features 24. It will be appreciated that battery cell interconnect device 20' would need to be paired with an additional battery cell interconnect device with at least two mating female stacking features configured to receive male stacking features 24 of battery cell interconnect device 20'. FIG. 10 illustrates a second exemplary alternative embodiment of a battery cell interconnect device. Battery cell interconnect device 20" is illustrated, including two male stacking features 24 located on a first side of the device and including two female stacking features 26 located on a second side of the device.

Figure 11:
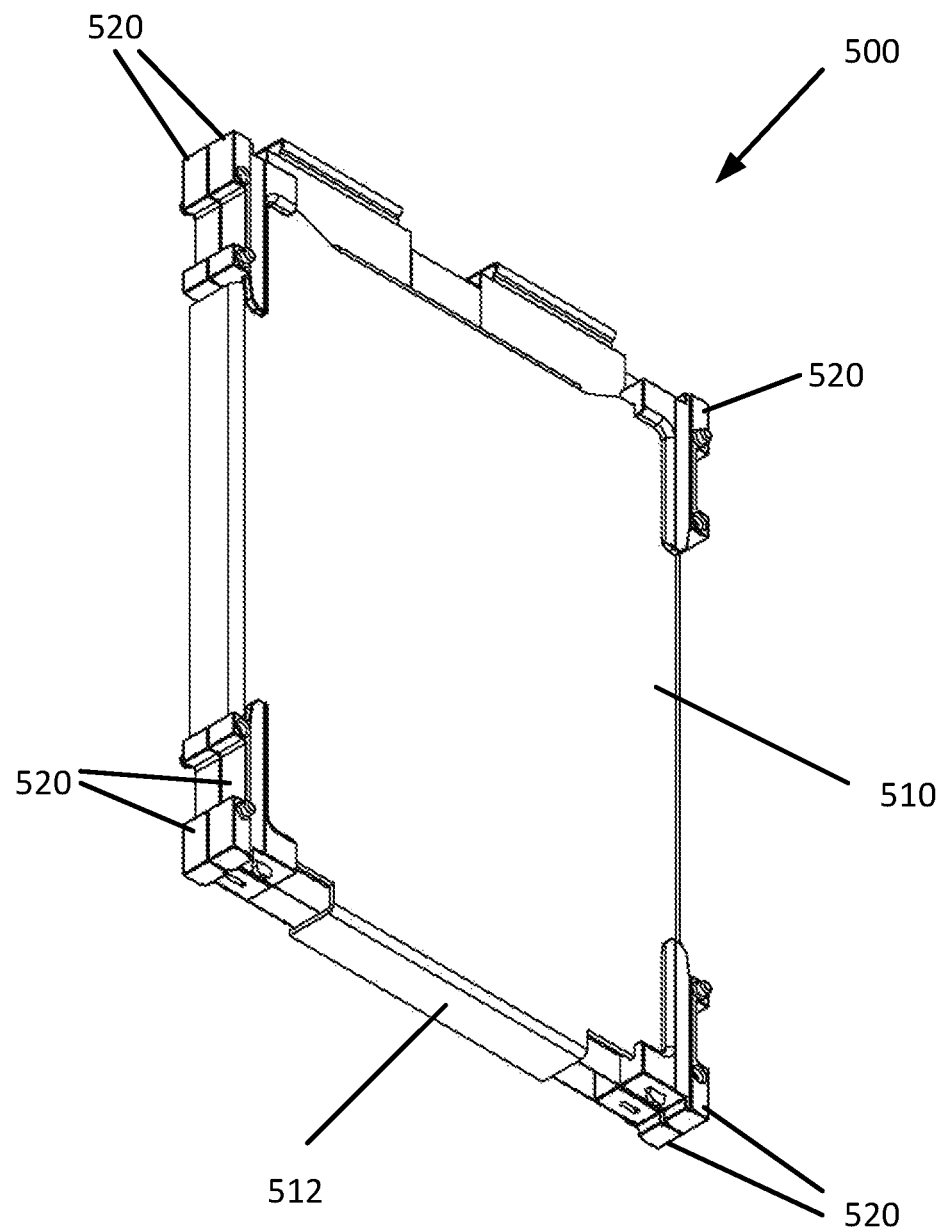
FIG. 11 illustrates alternative exemplary battery cell components attached to each other with battery cell interconnect devices, wherein a bottom surface of one of the components acts as a heat transfer surface with a battery cell cooling feature, in accordance with the present disclosure.

FIG. 11 illustrates alternative exemplary battery cell components attached to each other with battery cell interconnect devices, wherein a bottom surface of one of the components acts as a heat transfer surface with a battery cell cooling feature. Battery cell components 500 are illustrated connected to each other with battery cell interconnect devices 520, which are similar to the battery cell interconnect device of FIG. 1A. Battery cell components 500 include battery cell cooling fin 510 which includes a folded over bottom portion 512 which includes a flat face perpendicular to the face of battery cell cooling fin 510. Folded over bottom portion 512 can be attached to an exemplary cooling plate or panel including a coolant loop therewithin, such that heat transferred to battery cell cooling fin 510 can be subsequently transferred to the cooling plate or panel through folded over bottom portion 512. Battery cell interconnect devices 520 facilitate this heat transfer function by holding battery cell components 500 at the corners and leaving the bottom of battery cell components 500 open and accessible.

Figure 12:
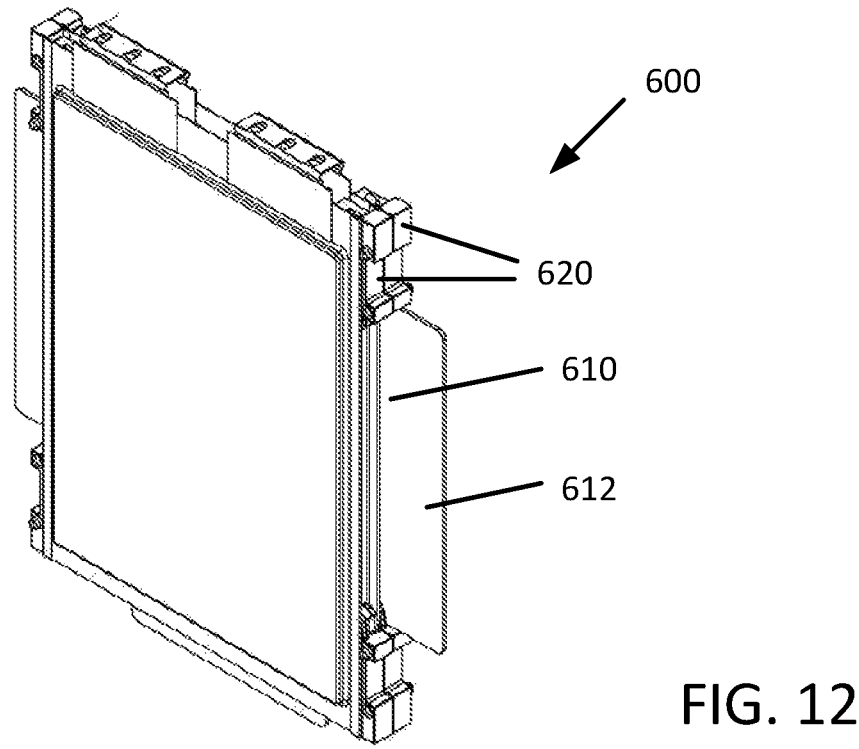
FIGS. 12 and 13 illustrate alternative exemplary battery cell components attached to each other with battery cell interconnect devices, wherein a battery cell cooling fin is configured for air cooling, in accordance with the present disclosure.
Figure 13:
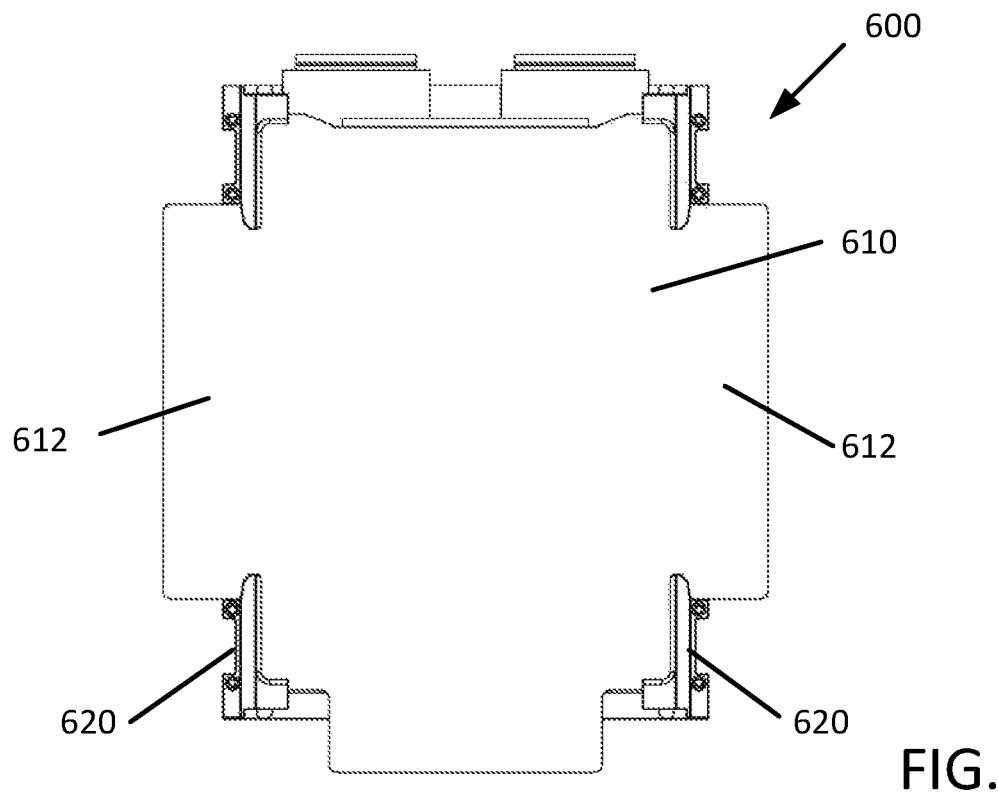

FIGS. 12 and 13 illustrate alternative exemplary battery cell components attached to each other with battery cell interconnect devices, wherein a battery cell cooling fin is configured for air cooling. FIG. 12 illustrates the battery cell components from a front perspective view. FIG. 13 illustrates the battery cell components from a rear view. Battery cell components 600 are illustrated connected to each other with battery cell interconnect devices 620, which are similar to the battery cell interconnect device of FIG. 1A. Battery cell components 600 include battery cell cooling fin 610 which includes extended cooling fin portion 612. Extended cooling fin portions 612 extend from both sides of battery cell components 600 and enable air cooling of battery cell cooling fin 610. Battery cell interconnect devices 620 facilitate this air cooling by holding battery cell components 600 at the corners, leaving room for extended cooling fin portions 612 to extend from the sides of battery cell components 600, and further, by maintaining a gap between cooling fin 610 and a neighboring cooling fin, such that air may pass between the cooling fins and promote additional air cooling.

Figure 14A:
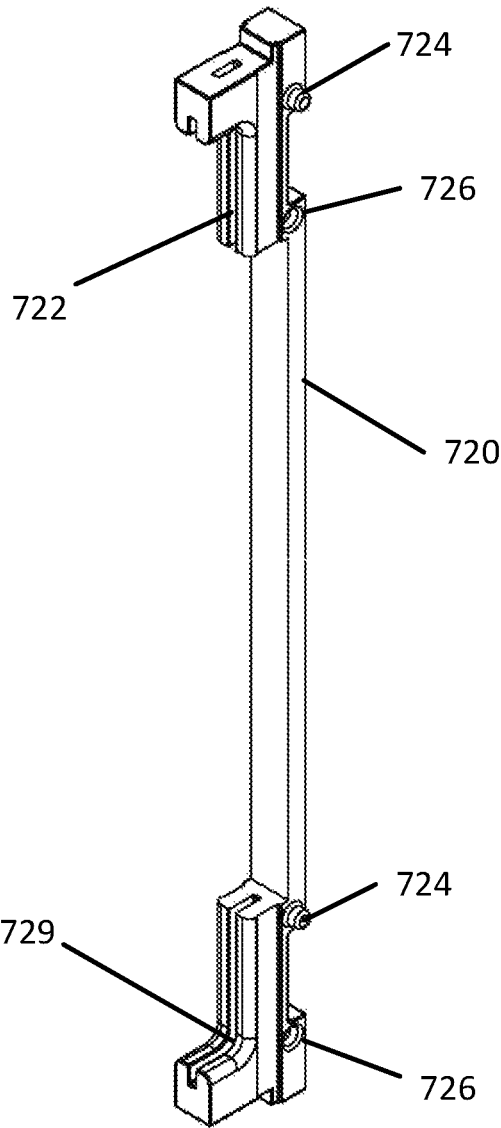
FIGS. 14A and 14B illustrate an additional exemplary alternative embodiment of a battery cell interconnect device, wherein the interconnect device is configured to attach to both a top and a bottom of a side edge of a battery cell cooling fin, in accordance with the present disclosure.
Figure 14B:
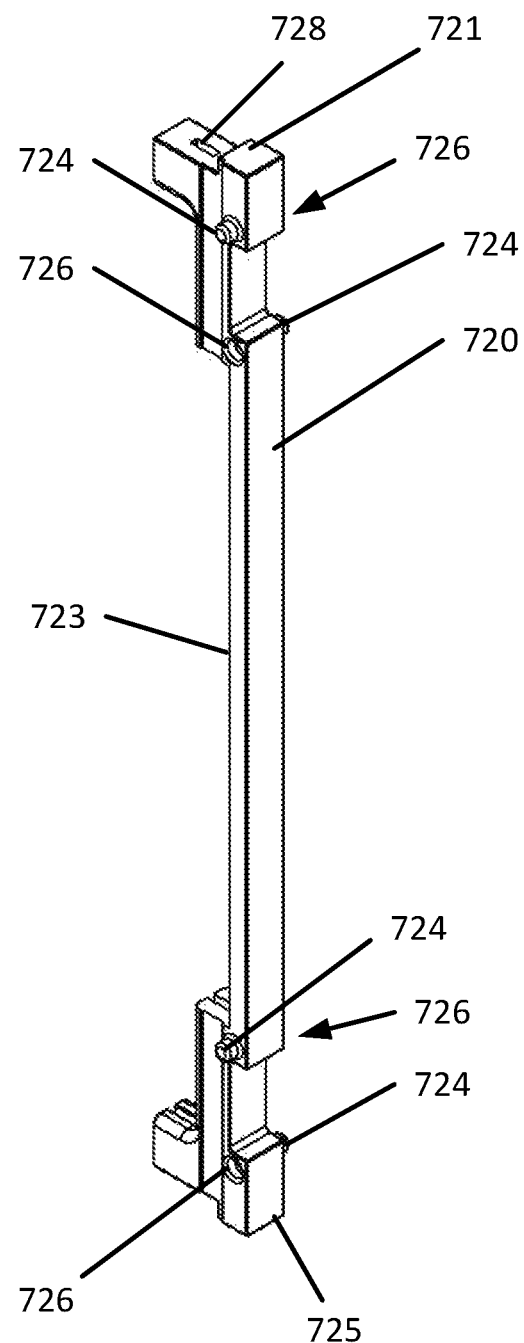

FIGS. 14A and 14B illustrate an additional exemplary alternative embodiment of a battery cell interconnect device, wherein the interconnect device is configured to attach to both a top and a bottom of a side edge of a battery cell cooling fin. FIG. 14A illustrates the battery cell interconnect device from a first perspective view. FIG. 14B illustrates the battery cell interconnect device from a second perspective view. Battery cell interconnect device 720 is illustrated with a top portion 721 configured to attach to a top corner of a battery cell component and a bottom portion 725 configured to attach to a bottom corner of the battery cell component. Middle portion 723 attaches top portion 721 and bottom portion 725. Battery cell interconnect device 720 is illustrated including a plurality of male stacking features 724 and female stacking features 726. Battery cell interconnect device 720 is further illustrated including a first slot 722 and a second slot 729, each configured to attach to a corner of the battery cell component being attached to. Optional corner tab hole 728 is illustrated for attachment to a corner tab of a battery cell component. While battery cell interconnect devices 720 are illustrate configured to attach to side edges of battery cell components, it will be appreciated that they can be alternatively configured to attach to both top and bottom surfaces of the battery cell components.

Figure 15A:
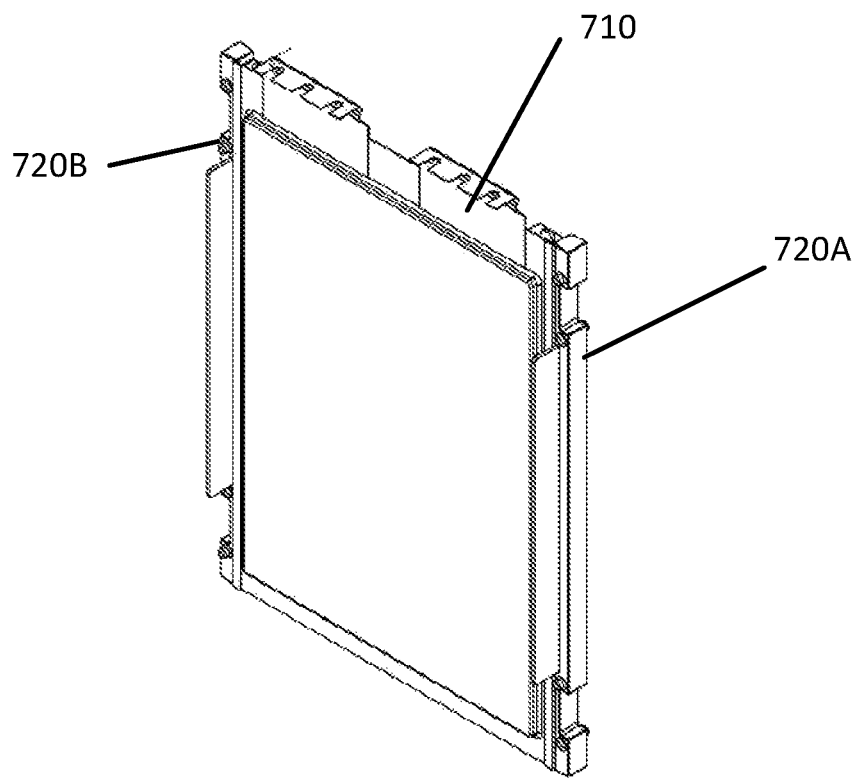
FIGS. 15A and 15B illustrate an exemplary battery cell cooling fin with two exemplary battery cell interconnect devices of FIG. 14A attached to corners of the battery cell cooling fin, in accordance with the present disclosure.
Figure 15B:
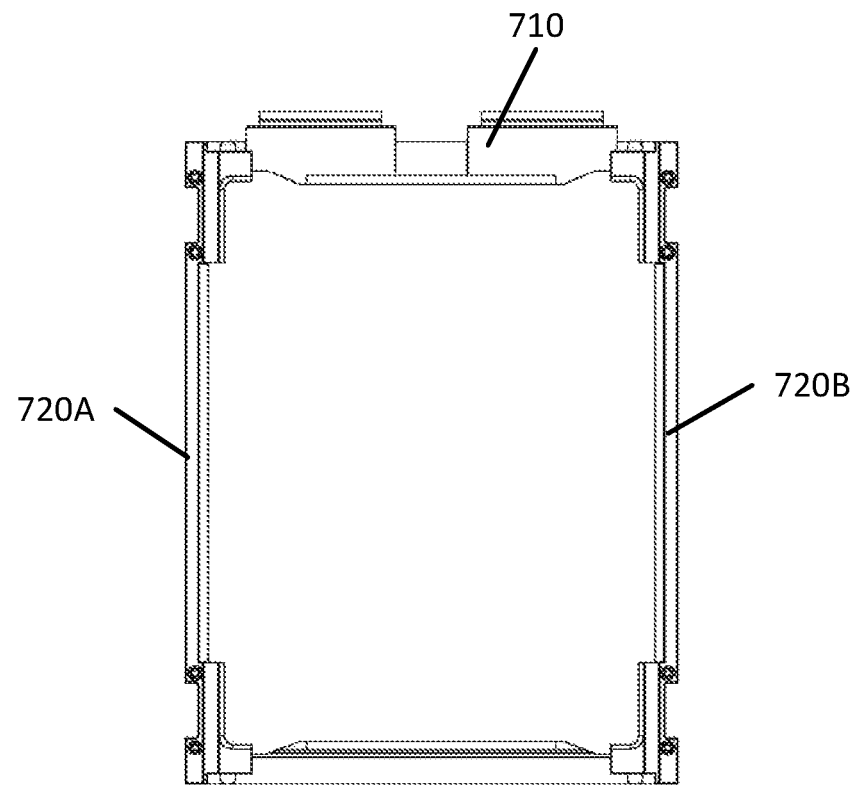

FIGS. 15A and 15B illustrate an exemplary battery cell cooling fin with two exemplary battery cell interconnect devices of FIG. 14A attached to corners of the battery cell cooling fin. FIG. 15A illustrate the battery cell cooling fin from a front perspective view. FIG. 15B illustrates the battery cell cooling fin from a rear view. Battery cell cooling fin 710 is illustrated including a first battery cell interconnect device 720A attached to one side edge of the cooling fin and a second battery cell interconnect device 720B attached to a second side edge of the cooling fin. Battery cell interconnect device 720A and battery cell interconnect device 720B can each be identical to the battery cell interconnect device of FIG. 14A, or either device can include minor variations from the battery cell interconnect device of FIG. 14A and from each other.

Figure 16A:
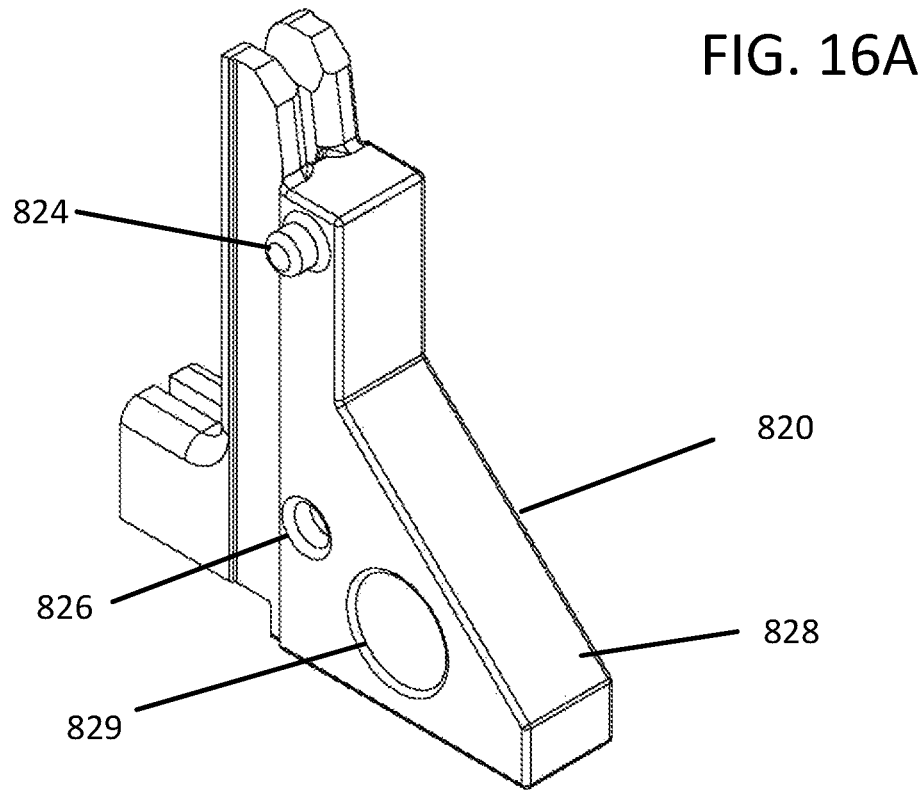
FIGS. 16A and 16B illustrate an additional exemplary alternative embodiment of a battery cell interconnect device, wherein the interconnect device includes a structural attachment feature including an attachment hole, in accordance with the present disclosure.
Figure 16B:
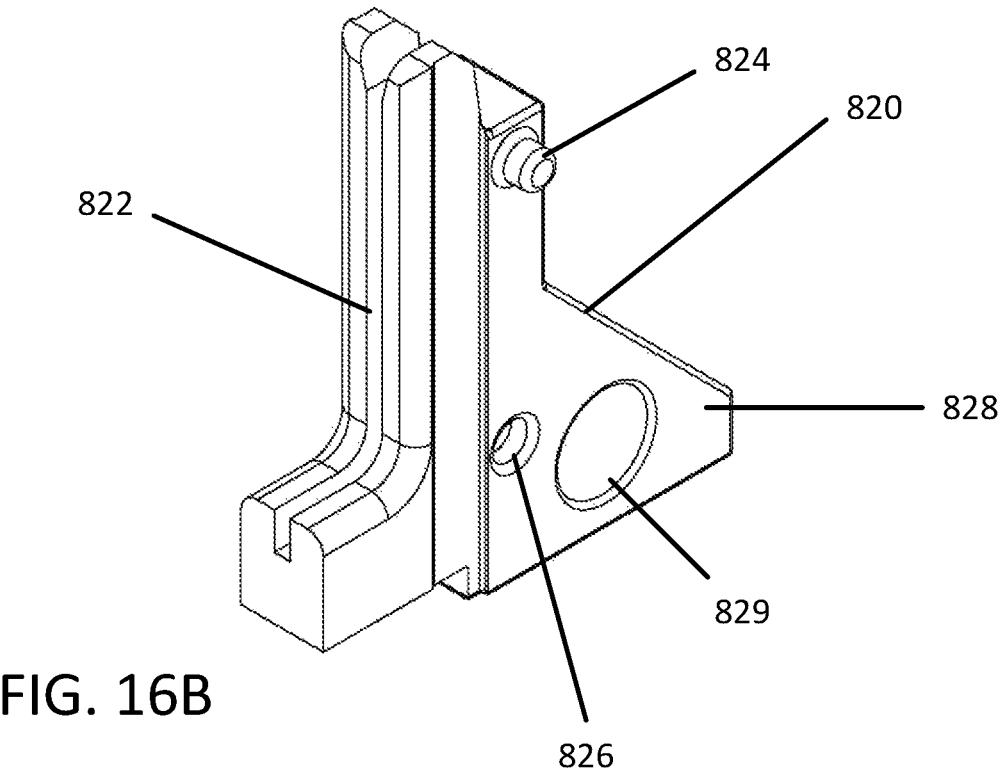

FIGS. 16A and 16B illustrate an additional exemplary alternative embodiment of a battery cell interconnect device, wherein the interconnect device includes a structural attachment feature including an attachment hole. FIG. 16A illustrate the battery cell interconnect device from a first perspective view. FIG. 16B illustrates the battery cell interconnect device from a second perspective view. Battery cell interconnect device 820 includes a plurality of male stacking features 824 and a female stacking features 826 and slot 822 configured to receive a corner of an exemplary battery cell component. Additionally, battery cell interconnect device 820 includes structural tab 828 including attachment hole 829. Attachment hole 829, or aligned set of attachment holes 829 along a side of a battery cell stack, can be used to receive a hold down strap or attachment rod, such that the battery cell can be held in place through attachment holes 829.

Figure 17:
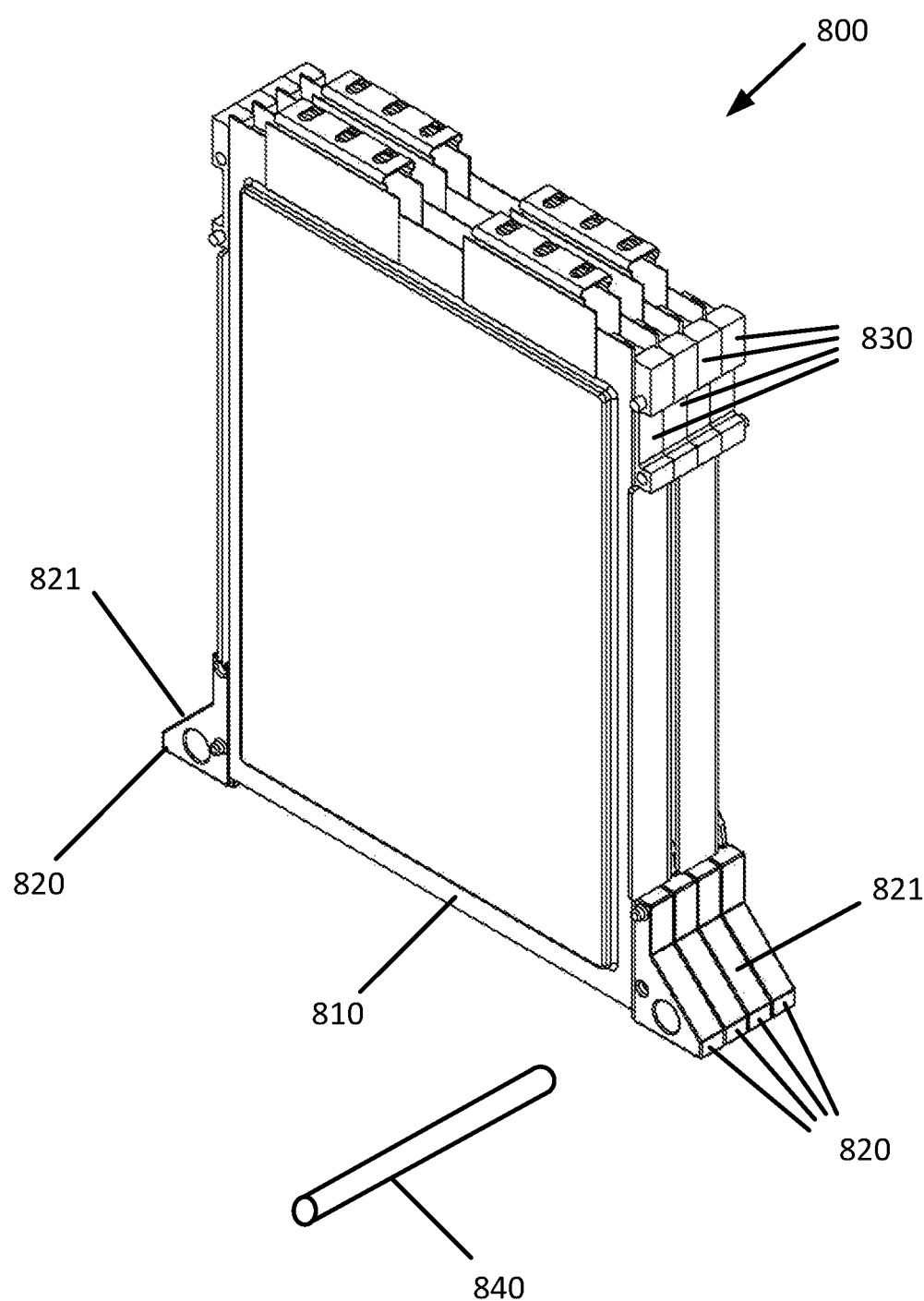
FIG. 17 illustrates an exemplary battery cell stack including a plurality of battery cell interconnect devices of FIG. 16A attached at bottom corners of the battery cell stack, in accordance with the present disclosure.

FIG. 17 illustrates an exemplary battery cell stack including a plurality of battery cell interconnect devices of FIG. 16A attached at bottom corners of the battery cell stack. Battery cell stack 800 is illustrated including a plurality of battery cell components including battery cell cooling fin 810. A plurality of battery cell interconnect devices 820 are illustrated attached at bottom corners of components of battery cell stack 800. Attachment holes of battery cell interconnect devices 820 are aligned, enabling one to attach battery cell stack 800 to an exemplary vehicle chassis or other structure through the attachment holes. Battery cell interconnect device 830, similar to the battery cell interconnect device of FIG. 1A, are illustrated attached at top corners of the battery cell components of battery cell stack 800. Exemplary attachment rod 840 is illustrated configured to be inserted within the aligned attachment holes of battery cell interconnect devices 820.

Battery cell interconnect device 820 in FIG. 16A is described to include structural tab 828. As is illustrated in FIG. 17, as the structural tabs of a plurality of battery cell interconnect devices 820 are aligned, a slanted or angled surface 821 is formed along battery cell interconnect devices 820. Angled surface 821 may additionally or alternatively be used as an area for compressive hold-down of the battery assembly, similar to conventional lead-acid transportation batteries known in the art.

Figure 18:
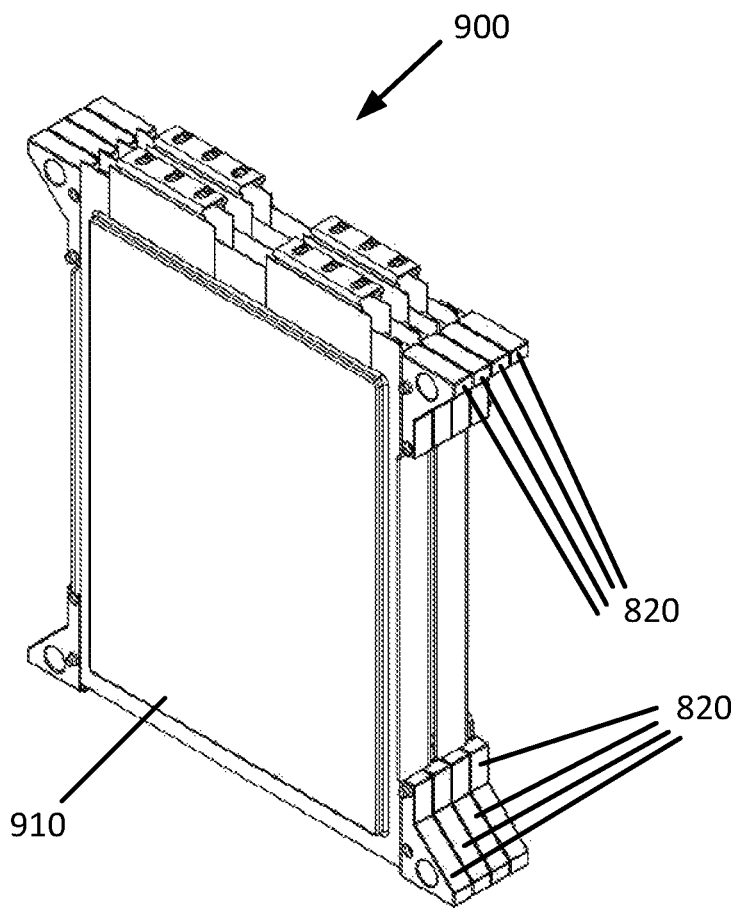
FIGS. 18 and 19 illustrate an exemplary battery cell stack including a plurality of battery cell interconnect devices of FIG. 16A attached at both bottom and top corners of the battery cell stack, in accordance with the present disclosure.
Figure 19:
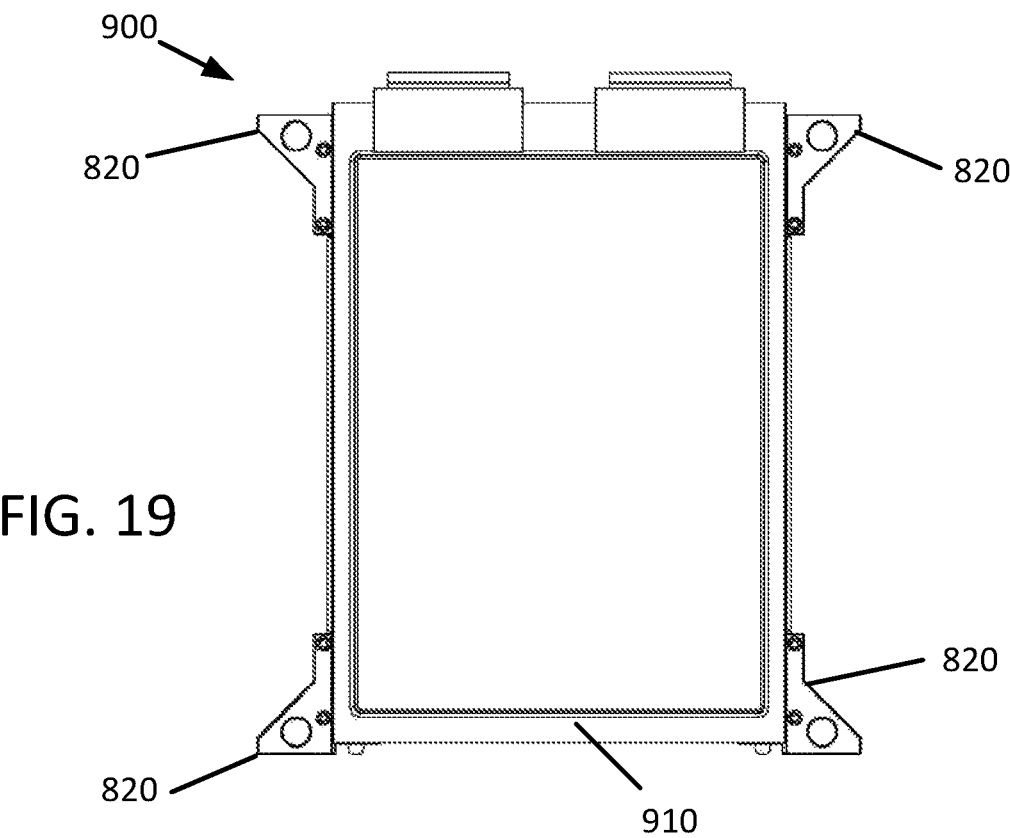

FIGS. 18 and 19 illustrate an exemplary battery cell stack including a plurality of battery cell interconnect devices of FIG. 16A attached at both bottom and top corners of the battery cell stack. FIG. 18 illustrates the battery cell stack from a perspective view. FIG. 19 illustrates the battery cell stack from a front view. Battery cell stack 900 is illustrated including a plurality of battery cell components including battery cell cooling fin 910. A plurality of battery cell interconnect devices 820 are illustrated attached at both bottom corners of components of battery cell stack 800 and top corners of components of battery cell stack 800.

The disclosed battery cell interconnect devices hold separate battery cell cooling fins attached to neighboring battery cell packs. As a result, each battery cell pack can be monitored or estimated to be a particular temperature, and each battery cell pack can be controlled separately, thereby increasing precision to which the overall battery cell stack can be utilized. Such utilization can be disclosed to include a system including a computerized processor including programming configured to monitor the temperature of each battery cell pack or estimate the temperature of each battery cell pack, compare the temperature of each battery cell pack to a desired temperature range for the battery cell pack, and control operation of the battery cell pack based upon the comparison.

The disclosed battery cell interconnect devices may attach a first battery cell cooling fin and a second battery cell cooling fin to opposite sides of a battery cell pack, with two or more battery cell interconnect devices providing the connection. In another embodiment, the two cooling fins can be attached to each other through conventional mean around the battery cell pack, and this combination of the cooling fins and the battery cell pack can be attached to four exemplary battery cell interconnect devices and held separate from neighboring combinations of the cooling fins and the battery cell packs with the battery cell interconnect devices without the battery cell interconnect devices actually providing the attachment/compression force of the combination to itself.

Battery cell packs, battery cell cooling fins, and other features herein are described in some embodiments as being rectangular shaped. It will be appreciated that rectangular shaped objects can include rounded corners, for example, as illustrated in the various figures, and still include generally four side edges in a rectangular configuration.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A system comprising a multi-cell energy storage device, the system comprising:
    a first battery cell pack;
    a first battery cell cooling fin situated on a side of the first battery cell pack;
    a second battery cell pack;
    a second battery cell cooling fin situated on a side of the second battery cell pack, wherein the first battery cell cooling fin and the second battery cell cooling fin are situated between the first battery cell pack and the second battery cell pack;
    at least one battery cell interconnect device holding the first battery cell cooling fin separate from the second battery cell cooling fin;
wherein the battery cell interconnect device is configured to insulate the first battery cell cooling fin from the second battery cell cooling fin.

2. The system of claim 1, wherein the battery cell interconnect device is constructed with a polymer.

3. The system of claim 1, wherein the battery cell interconnect device is constructed with a glass-filled polymer.

4. The system of claim 1, further comprising a first battery cell interconnect device attached to the first battery cell cooling fin and a second battery cell interconnect device attached to the second battery cell cooling fin; and
    wherein the first battery cell interconnect device and the second battery cell interconnect device each comprise at least one mating stacking feature configured to enable connection of the first battery cell interconnect device to the second battery cell interconnect device.

5. The system of claim 1, further comprising a first pair of battery cell interconnect devices attached to the first battery cell cooling fin and a second pair of battery cell interconnect devices attached to the second battery cell cooling fin; and
    wherein the first pair of battery cell interconnect devices and the second pair of battery cell interconnect devices each comprise mating stacking features configured to enable connection of the first pair of battery cell interconnect devices to the second pair of battery cell interconnect devices.

6. The system of claim 1, further comprising a first set of four battery cell interconnect devices attached to the first battery cell cooling fin and a second set of four battery cell interconnect devices attached to the second battery cell cooling fin; and
    wherein the first set of four battery cell interconnect devices and the second set of four battery cell interconnect devices each comprise mating stacking features configured to enable connection of the first set of four battery cell interconnect devices to the second set of four battery cell interconnect devices.

7. The system of claim 6, wherein the first battery cell cooling fin is rectangular; and
    wherein the first set of four battery cell interconnect devices are attached to the corners of the first battery cell cooling fin.

8. The system of claim 6, wherein a portion of the battery cell interconnect devices include a notch configured to receive a belt strap configured to provide structural rigidity to the multi-cell energy storage device.

9. The system of claim 6, wherein a portion of the battery cell interconnect devices include an attachment hole configured to receive an attachment rod configured to provide structural rigidity to the multi-cell energy storage device.

10. The system of claim 1, wherein the first battery cell cooling fin comprises a bent portion configure to attach to a cooling plate.

11. The system of claim 1, wherein the first battery cell cooling fin comprises an extended cooling fin portion configured to provide air cooling of the first battery cell cooling fin.

12. The system of claim 1, wherein the first battery cell cooling fin comprises a rectangular shaped depression;
    wherein the first battery cell pack comprises a rectangular shaped battery cell pack; and wherein the rectangular shaped depression is configured to receive and securely hold the first battery cell pack.

13. A system comprising a multi-cell energy storage device, the system comprising:
- a first battery cell pack;
- a first battery cell cooling fin situated on a side of the first battery cell pack, wherein the first battery cell cooling fin is rectangular;
- a first set of four battery cell interconnect devices attached to four corners of the first battery cell cooling fin;
- a second battery cell pack;
- a second battery cell cooling fin situated on a side of the second battery cell pack, wherein the second battery cell cooling fin is rectangular and wherein the first battery cell cooling fin and the second battery cell cooling fin are situated between the first battery cell pack and the second battery cell pack;
- a second set of four battery cell interconnect devices attached to four corners of the second battery cell cooling fin;

wherein the battery cell interconnect devices are configured to separate and insulate the first battery cell cooling fin from the second battery cell cooling fin.

* * * * *